(12) United States Patent
Betker et al.

(10) Patent No.: US 8,191,067 B2
(45) Date of Patent: *May 29, 2012

(54) METHOD AND APPARATUS FOR ESTABLISHING A BOUND ON THE EFFECT OF TASK INTERFERENCE IN A CACHE MEMORY

(75) Inventors: Michael Richard Betker, Allentown, PA (US); Harry Dwyer, Annandale, NJ (US); John Susantha Fernando, Coopersburg, PA (US)

(73) Assignee: Agere Systems Inc., Allentown, PA (US)

( * ) Notice: Subject to any disclaimer, the term of this patent is extended or adjusted under 35 U.S.C. 154(b) by 427 days.

This patent is subject to a terminal disclaimer.

(21) Appl. No.: 12/027,683

(22) Filed: Feb. 7, 2008

(65) Prior Publication Data

US 2008/0196036 A1 Aug. 14, 2008

Related U.S. Application Data

(63) Continuation of application No. 10/081,308, filed on Feb. 20, 2002, now Pat. No. 7,353,513.

(51) Int. Cl.
*G06F 9/46* (2006.01)
*G06F 12/08* (2006.01)
*G06F 13/00* (2006.01)

(52) U.S. Cl. ............. 718/102; 718/104; 711/3; 711/150

(58) Field of Classification Search .................. 718/104; 711/3
See application file for complete search history.

(56) References Cited

U.S. PATENT DOCUMENTS

| | | | |
|---|---|---|---|
| 5,274,811 A | 12/1993 | Borg et al. | 717/128 |
| 6,272,599 B1 | 8/2001 | Prasanna | 711/138 |
| 6,317,874 B1 | 11/2001 | Prasanna | 717/165 |
| 6,321,240 B1 | 11/2001 | Chilimbi et al. | 707/206 |
| 6,606,715 B1 | 8/2003 | Kikuchi | 714/15 |
| 6,681,387 B1 | 1/2004 | Hwu et al. | 717/158 |
| 2001/0008009 A1* | 7/2001 | Johnson | 711/128 |

OTHER PUBLICATIONS

Dwyer et al., "Establishing a Tight Bound on Task Interference in Embedded System Instruction Caches", Nov. 16-17, 2001, ACM, pp. 8-14.*

(Continued)

*Primary Examiner* — Kenneth Tang
(74) *Attorney, Agent, or Firm* — Ryan, Mason & Lewis, LLP (57) ABSTRACT

A method and apparatus are disclosed for establishing a bound on the effect of task interference in an instruction cache shared by multiple tasks. The bound established by the present invention is the maximum number of "live" frames of a given task that are coexistent during the execution of an application. A "live cache frame" contains a block that is accessed in the future without an intervening eviction. The eviction of blocks from a live frame by an interrupt causes a future miss that would not otherwise occur and evictions from live frames are the only evictions that cause misses that would not otherwise occur. The invention provides a more accurate estimate of the maximum additional execution time of a task that results from servicing an interrupt during its execution. Additional accuracy is obtained by exploiting knowledge of the character of an intervening task to achieve a tighter bound, when possible.

12 Claims, 9 Drawing Sheets

OTHER PUBLICATIONS

Tomiyama et al., "Program Path Analysis to Bound Cache-Related Preemption Delay in Preemptive Real-Time Systems", 2000, ACM, pp. 67-71.*

Kaxiras et al, "Cache Decay: Exploiting Generational Behavior to Reduce Cache Leakage Power," IEEE, (2001).

Lai et al., "Dead-Block Prediction & Dead-Block Correlating Prefetchers," IEEE, (2001).

Mendelson et al, "Modeling Live and Dead Lines in Cache Memory System," IEEE, Trans. on Computers, vol. 42, No. 1, (Jan. 1993).

Lai et al , "Dead-Block Prediction & Dead-Block Correlating Prefetchers," IEEE, (2001).

Mendelson et al, "Modeling Live and Dead Lines in Cache Memory System," IEEE, Trans. on Computers, v. 42, No. 1, (Jan. 1993).

* cited by examiner

METHOD AND APPARATUS FOR ESTABLISHING A BOUND ON THE EFFECT OF TASK INTERFERENCE IN A CACHE MEMORY

CROSS REFERENCE TO RELATED APPLICATIONS

This application is a continuation of U.S. application Ser. No. 10/081,308, filed Feb. 20, 2002 now U.S. Pat. No. 7,353,513, incorporated by reference herein.

FIELD OF THE INVENTION

The present invention relates generally to methods and apparatus for evaluating software, and more particularly, to methods and apparatus for evaluating the impact of task interference on the execution time of a primary task that may be interrupted by one or more secondary tasks.

BACKGROUND OF THE INVENTION

Processors often use a cache to improve performance and decrease system costs. Caches temporarily store recently accessed information (blocks of instructions or data) in a small memory that is faster to access than a larger main memory. Caches are effective because a block that has been accessed once is likely to be accessed soon again or is often near a recently accessed block. Thus, as a task executes, the working set of a task (the instructions and data currently required for the task) is stored in the cache in the event that the information may be accessed again. A cache typically maps multiple blocks of information from the main memory into one place in a cache, typically referred to as a "set." A "block" refers to the minimum unit of information that can be present in a cache and a "frame" is the place in a cache where a single block may be stored. In a set associative cache, multiple frames are grouped into sets. For example, a two-way set associative cache has two frames in each set.

In many embedded applications, a primary task may be interrupted by one or more secondary tasks. Thus, following an interruption, as a secondary, interrupting task executes, the working set of the interrupting task is stored in the cache, potentially evicting the working set of the primary, interrupted task and thereby decreasing the performance of the primary, interrupted task when it resumes execution. When the primary, interrupted task resumes execution, portions of the working set that have been evicted from the cache must be obtained from main memory, causing "cache misses." Thus, the execution time of the primary, interrupted task is extended by the time taken to run the secondary task plus the miss penalty due to obtaining evicted portions of the cached information from the main memory.

A critical parameter of a real-time task is its maximum response time over all possible inputs. In some systems, a task scheduled allocates a processor's cycles among multiple tasks to meet their response time requirements. Thus, the worst-case execution time of each task must be known. When instruction timings or execution paths are uncertain, conservative (worst case) assumptions are often made that may waste system capability or lead to an unnecessarily costly system. If the resulting worst-case time-bound is loose, a task is allocated more execution time than it can possibly use, wasting system capability and performance. Efficient system design thus requires methods to tightly estimate the effect of complex cache behavior. A need therefore exists for methods and apparatus that evaluate the additional execution time of the primary, interrupted task attributed to any interrupts. A hither need exists for methods and apparatus that establish a bound on the effect of task interference in an instruction cache shared by multiple tasks.

SUMMARY OF THE INVENTION

Generally, a method and apparatus are disclosed for establishing a bound on the effect of task interference in an instruction cache shared by multiple tasks. The bound established by the present invention is the maximum number of "live" frames of a given task that are coexistent during the execution of an application. As used herein, a "live cache frame" is a cache frame that contains a block that is accessed in the future without an intervening eviction. The present invention recognizes that the eviction of blocks from a live frame by an interrupt causes a future miss that would not otherwise occur and that evictions from live frames are the only evictions that cause misses that would not otherwise occur.

The present invention thus provides a more accurate estimate of the maximum additional execution time of a task that results from servicing an interrupt during its execution. The maximum additional execution time is attributed to three components, namely, the execution time of the interrupting task, the time to obtain and replace the blocks that are evicted from the cache by the blocks of the interrupting task and the consequences of altering the least recently used status in the cache.

The maximum number of live frames of a given task that are coexistent during the execution of an application can be generated, for example, by analyzing a time-stamped log of accesses to the cache to determine which frames are "live" at a given time. In a further variation, an application may be simulated for a period of time during which a candidate maximum is continually calculated and updated as required. Generally, a greater candidate maximum replaces a lesser candidate maximum during simulation. An algorithm can be generated to determine the maximum number of coexistent live frames experienced during a simulation and the point at which the maximum occurs upon completion of a simulation.

The general approach of the present invention assumes that an interrupt evicts the blocks in all of the live frames in a cache during its execution and is independent of the way interrupting tasks map to frames in an instruction cache. If the blocks of an interrupting task do not map to a set that contains a live application frame, then the contents of the live application frame cannot be evicted by the interrupt. Thus, in further variations of the present invention, additional improvements are obtained by exploiting knowledge of the character of an intervening task to achieve a tighter bound when possible. In one variation, the sets that contain an application's live frames are compared with the sets accessed by an interrupt to determine the maximum number of live-sets that may be accessed by an interrupt. Another variation exploits the fact that only an interrupt's accesses to the application's frames that are live at the interrupt point may cause future misses. Thus, the effect of an interrupt at each possible interrupt point is determined and the maximum of these becomes the worst-case bound.

A more complete understanding of the present invention, as well as further features and advantages of the present invention, will be obtained by reference to the following detailed description and drawings.

DETAILED DESCRIPTION

The present invention provides techniques for establishing a bound on task interference in real-time systems that employ an instruction cache shared by multiple tasks. Specifically, the present invention estimates the additional execution time of a task that results from servicing an interrupt during its execution. The execution time of a task is extended by an interrupt due to three components, namely, the execution time of the interrupting task, the time to obtain and replace the blocks that are evicted from the cache by the blocks of the interrupting task and the consequences of altering the least recently used status in the cache.

The bound established by the present invention is the maximum number of live frames that are coexistent during the execution of an application. As used herein, a "live cache frame" is a cache frame that contains a block that is accessed in the future without an intervening eviction. The present invention recognizes that the eviction of a task's block from a live frame by an interrupt causes a future miss that would not otherwise occur and that evictions from live frames are the only evictions that cause misses that would not otherwise occur. Thus, only the evictions of live cache frames cause future misses that would not otherwise occur. The maximum number of live frames coexistent during the execution of an application bound such misses, independent of the intervening tasks. In further variations of the present invention, knowledge of the character of an intervening task is exploited to achieve a tighter bound when possible.

Figure 1:
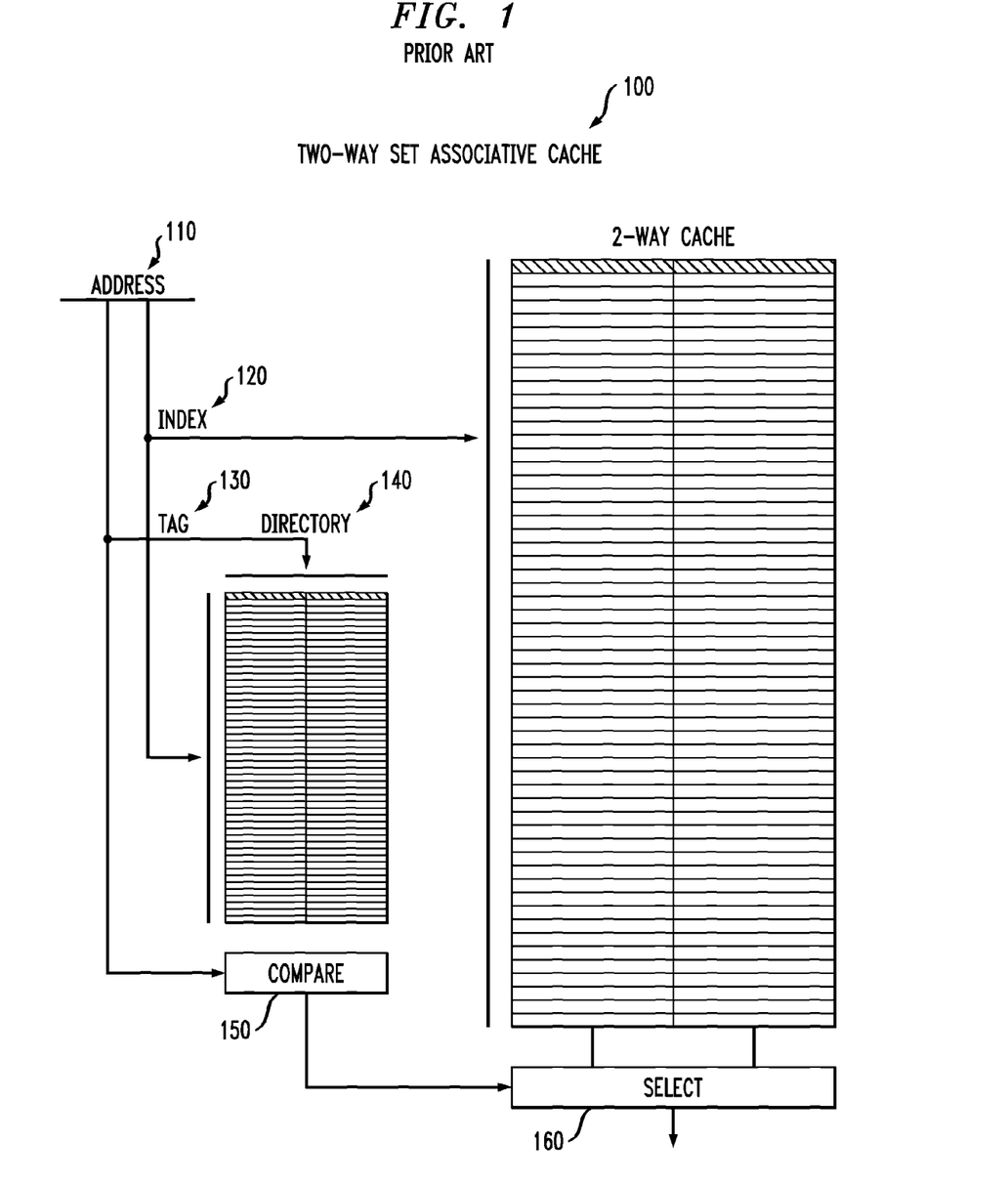
FIG. 1 illustrates a conventional scheme for addressing a typical cache.

FIG. 1 illustrates a conventional scheme for addressing a cache 100. As shown in FIG. 1, the exemplary cache 100 is a two-way set associative cache (two frames pet set). A portion of the address 110 of a block of main memory is a set index value identifying the corresponding set in the cache 100. While the present invention may be incorporated into all instruction cache organizations, the present invention is illustrated with a two-way set associative instruction cache that has two frames at each set address.

Any frame in a set may hold a block from main memory that maps to the set. A newly accessed block is usually stored in the set's least recently used (lru) frame and evicts its contents if occupied. An evicted block, because it is the least recently used block, is less likely to be accessed in the near future than those in other frames of the set. Least recently used block information is associated with each set for this purpose and is updated during each access.

The cache 100 is accessed with the address 110 of the requested block. The index portion 120 is used to access an entry (tag) in a table (directory) 140 that contains the address of the block. Each entry contains the address of the block (tag) that is in the corresponding frame of the set. The tags are compared using a comparator 150 with the address 110 of the requested block to find the frame that holds the block, if any. A cache miss results if the block is not in any of the frames. Since many blocks used by a program (or a set of programs) may map to the same set (because their index is the same), they share the frames in the set and evict each other over time as necessary.

As previously indicated, the present invention estimates the effect of an interrupt on the execution time of a task. Specifically, the present invention estimates the additional execution time of a task that results from servicing an interrupt during its execution. Typically, a designer employing conventional techniques may be compelled to make one or more of the following conservative and simplifying assumptions:

1. Task a's blocks fill the entire cache at the time of an interrupt;
2. All of task a's blocks are evicted during execution of an interrupt; or
3. All evicted blocks are accessed by task a after it resumes execution.

In an exemplary two-way set associative cache having 128 sets, where a cache miss requires 12 cycles to service, then the completion of task a is delayed 3072 cycles (128 sets×2 frames/set×12 cycles/frame to service) beyond that consumed by the interrupt's execution (which is assumed to be known). This result is multiplied by the maximum number of interrupts that may occur during the execution of task a. This conventional approach establishes a valid but potentially wasteful bound because many simplifying assumptions are made. A less wasteful analysis requires a more precise knowledge of task behavior in the cache.

Figure 2:
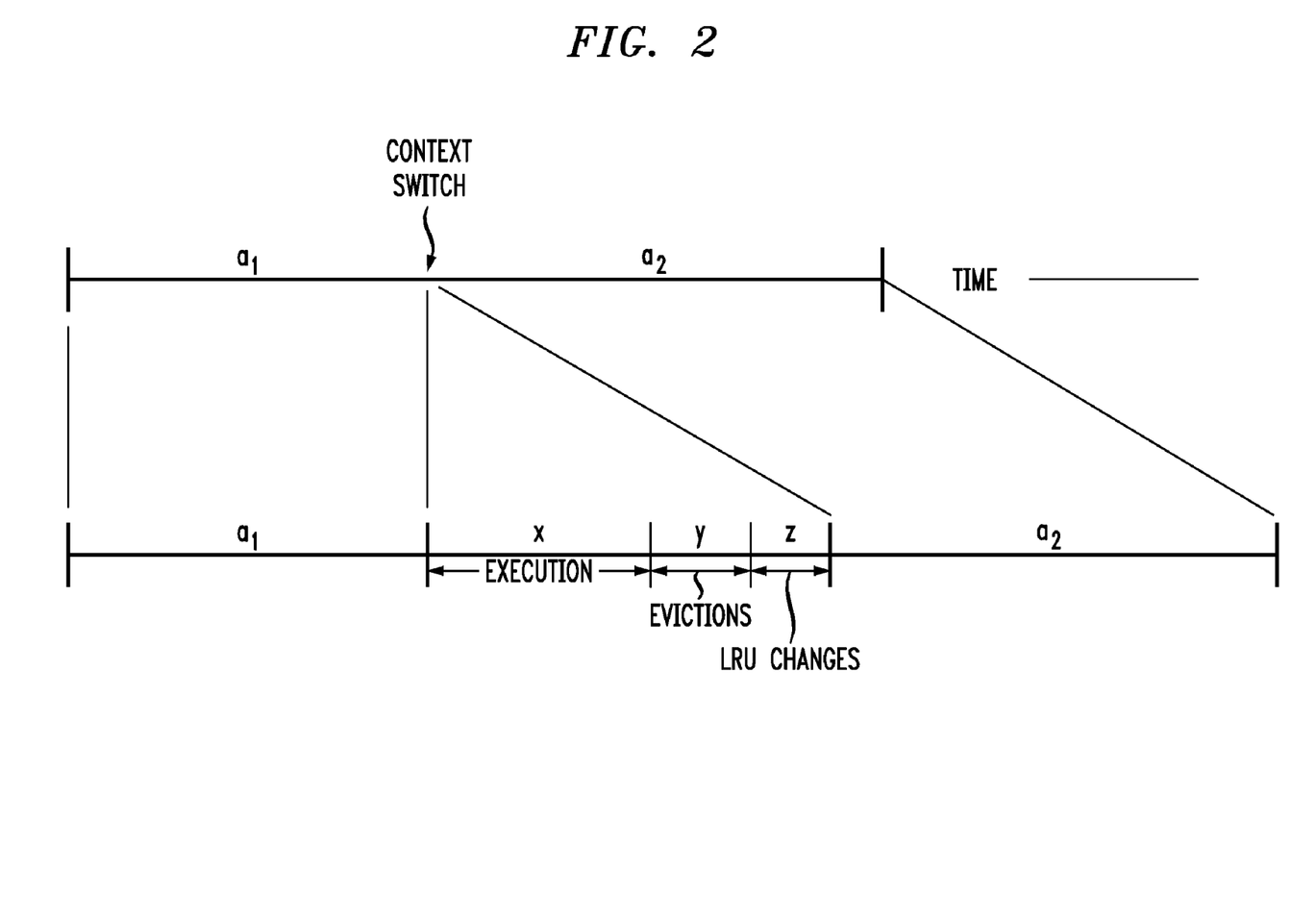
FIG. 2 illustrates the effects of a context switch in an instruction cache.

FIG. 2 illustrates the cache related effects of a context switch while a task (task a) is executing with other tasks that time-share an instruction cache. As shown in FIG. 2, the execution time of task a is extended by an interrupt via three effects, namely, (i) the interrupt's execution time (labeled x in FIG. 2), (ii) the interrupt evicting task a's blocks (labeled y in FIG. 2), and (iii) the consequences of altering the least recently used status in the cache (labeled z in FIG. 2). The first effect is due to the fact that while the interrupt is executing the interrupted task is not. The second effect is the additional time taken to fetch application blocks that are evicted from the cache by the interrupt's blocks. The potential effect of the perturbation on the least recently used status is subtle and discussed hereinafter.

Figure 3:
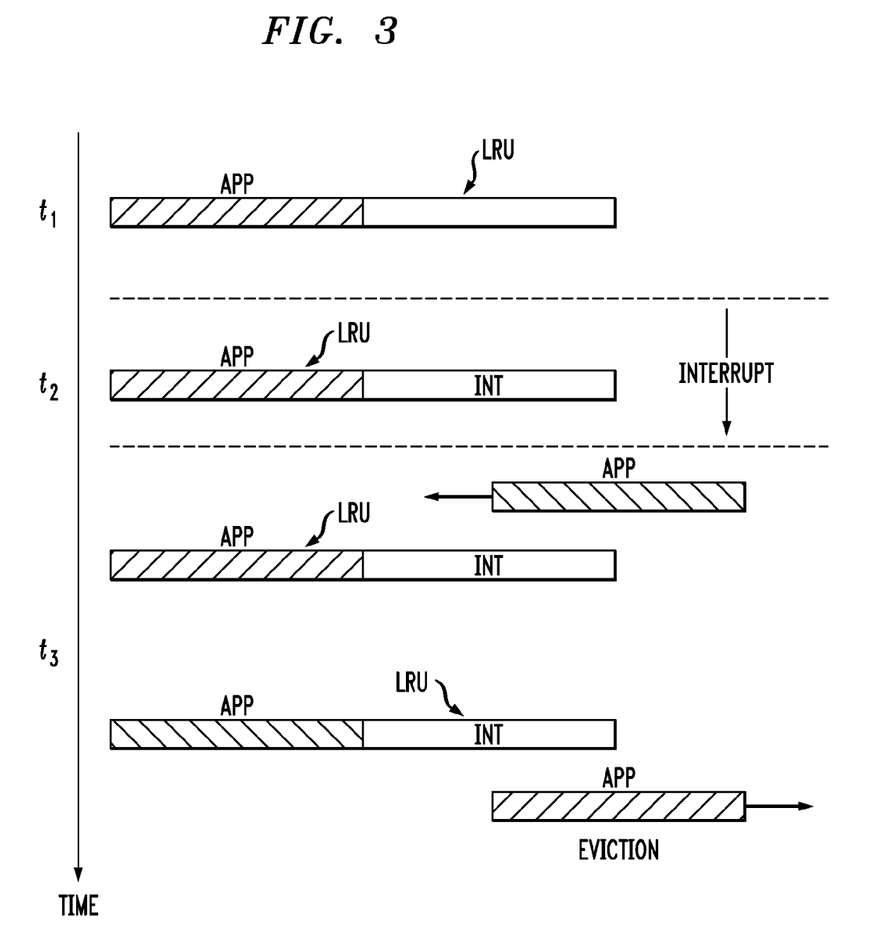
FIG. 3 illustrates a set in a two-way set-associative cache where an interrupt by an intervening task alters the least recently used status of the set.

FIG. 3 illustrates a set in a two-way set-associative cache where an interrupt by an intervening task alters the least recently used status of the set, thereby degrading the performance of a previously executing task when it resumes execution. Assume that an application (app) is executing and one of its blocks occupies the left frame and that the least recently used frame is the right frame (empty) at time $t_1$. An interrupt now occurs. A block of the interrupting task is inserted into the right frame during its execution (because it is the least recently used frame) at time $t_2$. The left frame is now the least recently used frame. After the interrupt completes, the original application (app) resumes execution. Because the least recently used information was perturbed by the interrupt, the next block stored into the set by the application evicts its own block, a block that was resident before the interrupt, and leaves the interrupt's block in the right frame undisturbed. If the application's block was in recent use at the time of the interrupt, it may be assessed again, and incur a miss that would not otherwise have occurred. Thus, an interrupt may adversely affect an application without evicting one of its blocks.

The conservative and simplifying assumptions employed by conventional techniques and discussed above, preclude the need to consider least recently used alterations. Since an interrupt's blocks are assumed to fill the entire cache, none of the application's blocks are assumed to be resident when it resumes execution so the state of the least recently used information is immaterial.

Live Cache Frames

The conservative and simplifying assumptions employed by conventional techniques and discussed above fail to consider the following factors:

1. Tasks a's blocks may not fill the entire cache;
2. Not all of task a's blocks may be evicted by an interrupt;
3. Not all evicted blocks may be subsequently accessed by task a; and
4. Not all evicted and subsequently accessed blocks incur a miss that would not otherwise have occurred.

Figure 4:
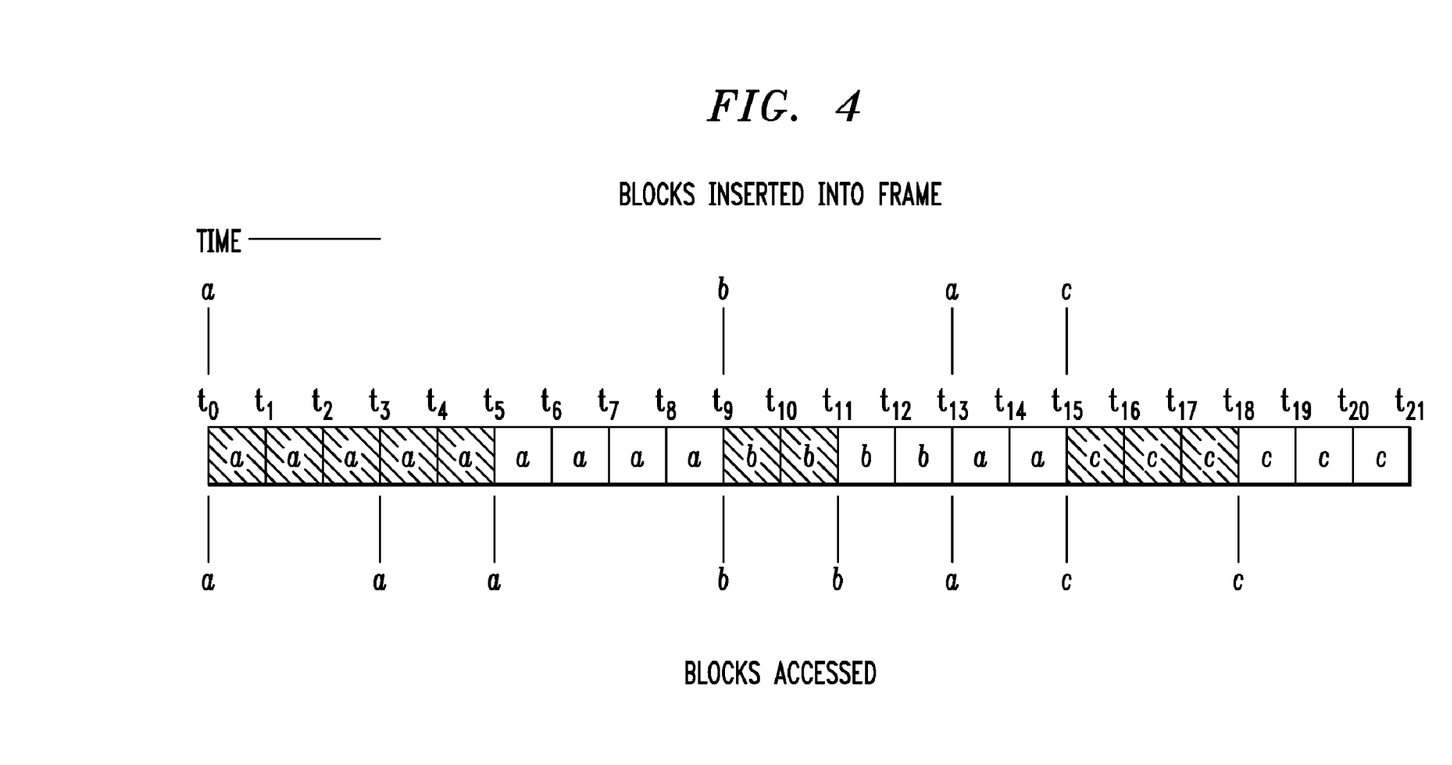
FIG. 4 illustrates the liveliness state of a cache frame in accordance with the present invention during execution of a task.

The present invention takes these factors into account to provide an improved analysis for estimating the additional execution time of a task caused by any potential interrupts. A cache frame is defined herein to be "live" at a time t if and only if the cache frame contains a block at time t that is accessed in the future without an intervening eviction. FIG. 4 illustrates the liveliness state of a cache frame during a task's execution. As shown in FIG. 4, three blocks (a, b, and c) are inserted into a frame and accessed at various times. The frame is shaded in live time periods. An insertion is caused by an initial access. Block a is inserted and accessed at $t_0$. It is subsequently accessed at $t_3$ and $t_5$. After $t_5$ block a is not accessed again before block b is inserted into the frame at $t_9$. Consequently, the frame is live from time $t_0$, the first access of block a, to time $t_5$, the last access of block a. The frame is not live from times $t_5$ to $t_9$ because the frame does not contain a block during that time that is accessed in the future without an intervening eviction. Note the situation at time $t_{13}$. Block a is inserted and accessed, but is not accessed in the future. Consequently, the frame does not become live at time $t_{13}$.

The present invention recognizes that the eviction of a task's block from a live frame by an interrupt causes a future miss that would not otherwise occur and that evictions from live frames are the only evictions that cause misses that would not otherwise occur.

Achieving a Tight Bound

Figure 5A:
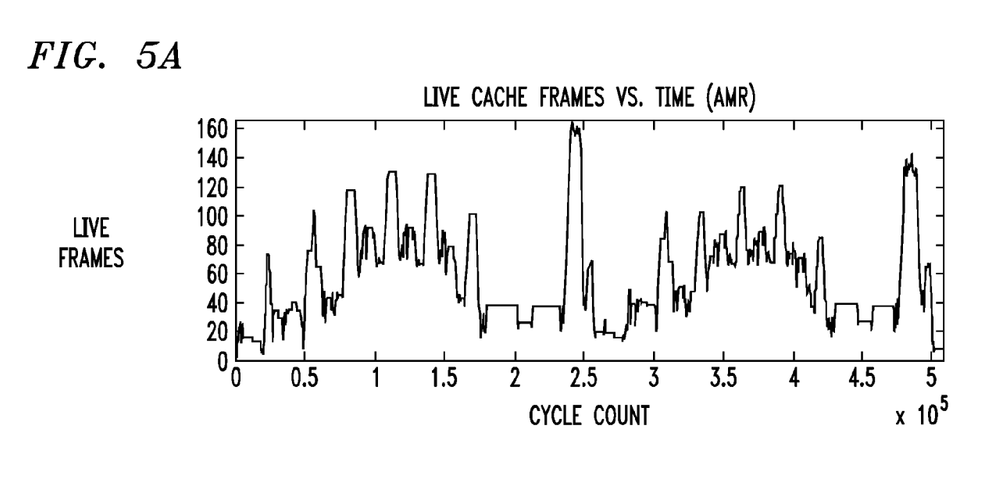
FIGS. 5A and 5B illustrate the distribution of live sets and frames in a cache during the execution of an exemplary adaptive multi-rate voice coder/decoder application.
Figure 5B:
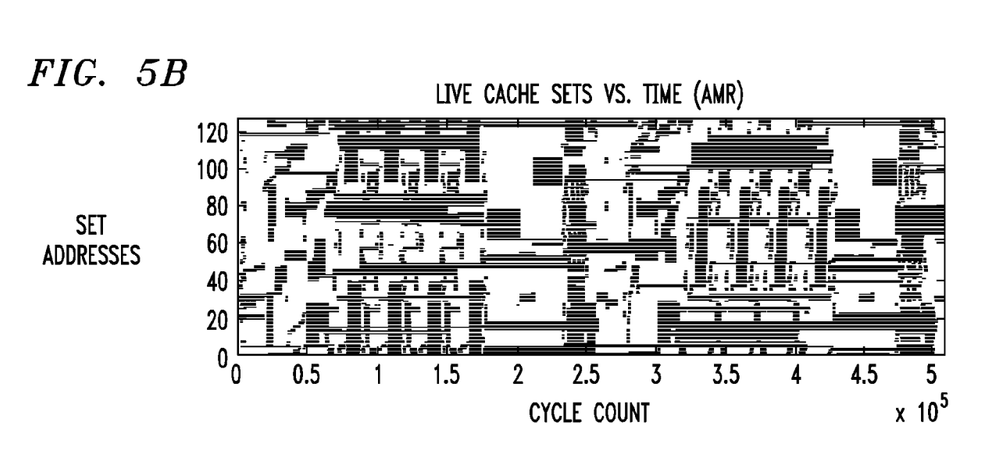

For purposes of illustration, a live cache frame distribution generated by an adaptive multi-rate voice coder/decoder (AMR) application is studied. It is again assumed that the instruction cache is a two-way set associative cache with 128 sets and that a cache miss requires 12 cycles to service. There are 256 frames in the cache (two frames in each set). FIGS. 5A and 5B illustrate the distribution of live sets and frames in the cache during the execution of the exemplary adaptive multi-rate voice coder/decoder. This distribution was obtained through cycle-accurate simulation of an implementation of the SC100 Architecture. FIG. 5A illustrates the total number of live frames over time during the execution of the exemplary adaptive multi-rate voice coder/decoder (time is expressed in processor clocks). For example, there are about 40 live frames in the cache at the $2 \times 10^5$ cycle point and a maximum of 162 occurs at approximately the $2.4 \times 10^5$ cycle point. Assume for now that this is the maximum over the AMR's entire execution.

Thus, the maximum number of additional misses that an interrupt can possibly cause in this application and in this cache is 162, regardless of the time at which the interrupt occurs or the number of blocks that the interrupt may cause to be inserted into the cache during its execution. It is therefore independent of the nature of the interrupt. The actual number of misses caused does depend on the nature of the interrupt, but 162 is a valid bound independent of the interrupt. The effect of the least recently used alterations discussed above is subsumed in these results. Because all application blocks in live frames are assumed to be evicted, a block evicted due to a least recently used alteration must be in a dead frame, and therefore does not affect execution time.

Thus, the completion of AMR may be delayed a maximum of 1944 cycles beyond that consumed by the interrupt's execution, since there is a maximum of 162 additional misses caused by the interrupt, and a miss takes 12 cycles (162× 12=1944). This bound should be compared with the 3072 cycles calculated in the simplistic approach, a 37% decrease. Similar results were observed for an exemplary Viterbi decoder application.

FIG. 5B illustrates the distribution of sets containing at least one live frame (termed live-sets) in time and by set location. A horizontal line in the graph represents the time extent of a live-set whose location is its y-axis intercept. The way an application's blocks map to cache sets and its live frame distribution may be studied with such a graph. One observation is that the worst case effect of cache interference may be decreased if interrupts may be disabled or deferred during code segments in which there is high live frame coexistence (e.g., during peaks in FIG. 5A). While this is not always practical, it may be beneficial in some situations.

Thus, a bound on the additional misses incurred by a task via cache interference achieved with the above method depends solely on the maximum number of coexistent live frames that may be generated by the task. Therefore, nested or multiple interventions do not alter the bound. A caveat is that it must be possible to find the maximum number of live frames coexistent during the execution of an application under all possible circumstances. Graphs like those in FIGS. 5A and 5B may be generated under various circumstances to allow post-execution analysis of the program, but formidable amounts of data must be recorded and processed to do so. The graphs in FIGS. 5A and 5B can be generated, for example, by analyzing a time-stamped log of accesses to the cache components to determine which frames are "live" at a given time, similar to the analysis discussed above in conjunction with FIG. 3.

In a further variation, an application may be simulated for a period of time during which a candidate maximum is continually calculated and updated as required. Generally, a greater candidate maximum replaces a lesser candidate maximum during simulation. A candidate maximum may be updated or replaced after it is established since the liveliness of a frame at any time depends on a future read with no intervening eviction. A candidate maximum becomes the true maximum at the end of a simulation when no further updates are possible. Negligible data is accumulated in this approach. An algorithm can be generated to determine the maximum number of coexistent live frames experienced during a simulation and the point at which it occurs upon completion of a simulation.

The approach of the present invention is independent of the way intervening tasks map to frames in an instruction cache. Two refinements are now presented that produce a tighter bound but depend on this mapping.

A First Refinement

The general approach of the present invention assumes that an interrupt evicts the blocks in all of the live frames in a cache during its execution. If an interrupt's blocks do not map to a set that contains a live application frame, then the contents of the live application frame cannot be evicted by the interrupt FIG. 6 illustrates a further variation of the present invention where the sets that contain an application's live frames are compared with the sets accessed by an interrupt to determine the maximum number of live-frames that may be affected by an interrupt.

Figure 6:
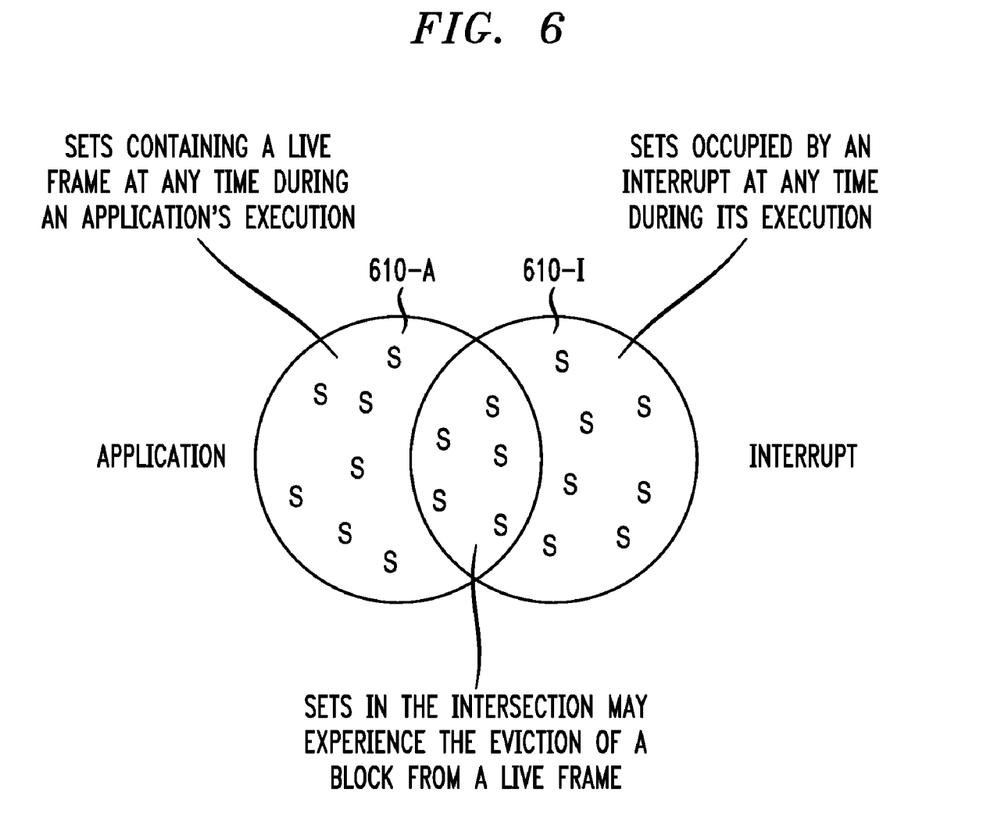
FIG. 6 illustrates a variation of the present invention where the sets that contain an application's live frames are shown with the sets accessed by an interrupt to determine the maximum number of live-frames that may be affected by an interrupt.

As shown in FIG. 6, two sets 610-A and 610-I are formed. The elements of set 610-A are the live-sets generated by the application during its execution. The elements of set 610-I are the cache sets accessed by the interrupt during its execution. The intersection of the two sets 610-A and 610-I contains the maximum number of live-sets accessed by the interrupt. Therefore, the cardinality of the intersection of the sets multiplied by the number of frames in a cache set is the maximum number of application misses that may be caused by the interrupt. The multiplication is necessary because an interrupt may access a set multiple times and evict blocks from multiple live frames in the set. The result is independent of the time at which an interrupt occurs.

A caveat is that the contents of both sets be independent of the data processed by a task. If data may change the cache sets accessed, the contents of the sets shown in FIG. 6 are data dependent, thereby invalidating the approach. Some sensitivity to data may be accommodated with the following procedure. If data changes the paths taken through an interrupt's or application's code and different cache sets are accessed on the different paths (or in the case of an application, different live-sets are generated), a set for each possible path is made and a comprehensive set is generated from their union. This results in two comprehensive sets (application and interrupt) and the cardinality of their intersection bounds the number of additional misses that may be caused by the interrupt.

It is noted that even if an application's instruction path is dependent on data processed, the live-sets generated may not change. This is because blocks on different paths may map to sets that are live-sets at some point (the time that it is live is not relevant) or, if they do not, they may map to sets that do not become live as a consequence (the blocks are read once, on their first access). Similarly, blocks accessed on alternate paths in an interrupt's code may map to the same sets or sets already used by the interrupt.

A Second Refinement

The first refinement discussed above does not exploit the fact that only an interrupt's accesses to the application's frames that are live at the interrupt point may cause future misses. The frames that are live before or after an interrupt point do not influence future misses caused by the interrupt.

FIG. 5B shows that the live frame pattern varies over time due to frame "births" and "deaths." The pattern is constant between accesses and may only change when the application accesses the cache. The time periods between application accesses are possible interrupt points. Recognizing that an interrupt may occur at any time, a refinement may be achieved by bounding the effect of an interrupt at each possible interrupt point and then taking the maximum of these as the worst-case bound.

Set Model

Essentially, the previous set intersection approach is used except that the cardinality of the intersection of the interrupt set (containing the cache sets it accesses) is taken with each of multiple application sets (each set containing its live-sets), one for each possible interrupt point. The maximum of these is the bound, i.e., the number of application misses that may be caused by the interrupt if it occurs at the point that causes the maximum number of evictions from live application frames.

Vector Implementation of Set Model

Figure 7:
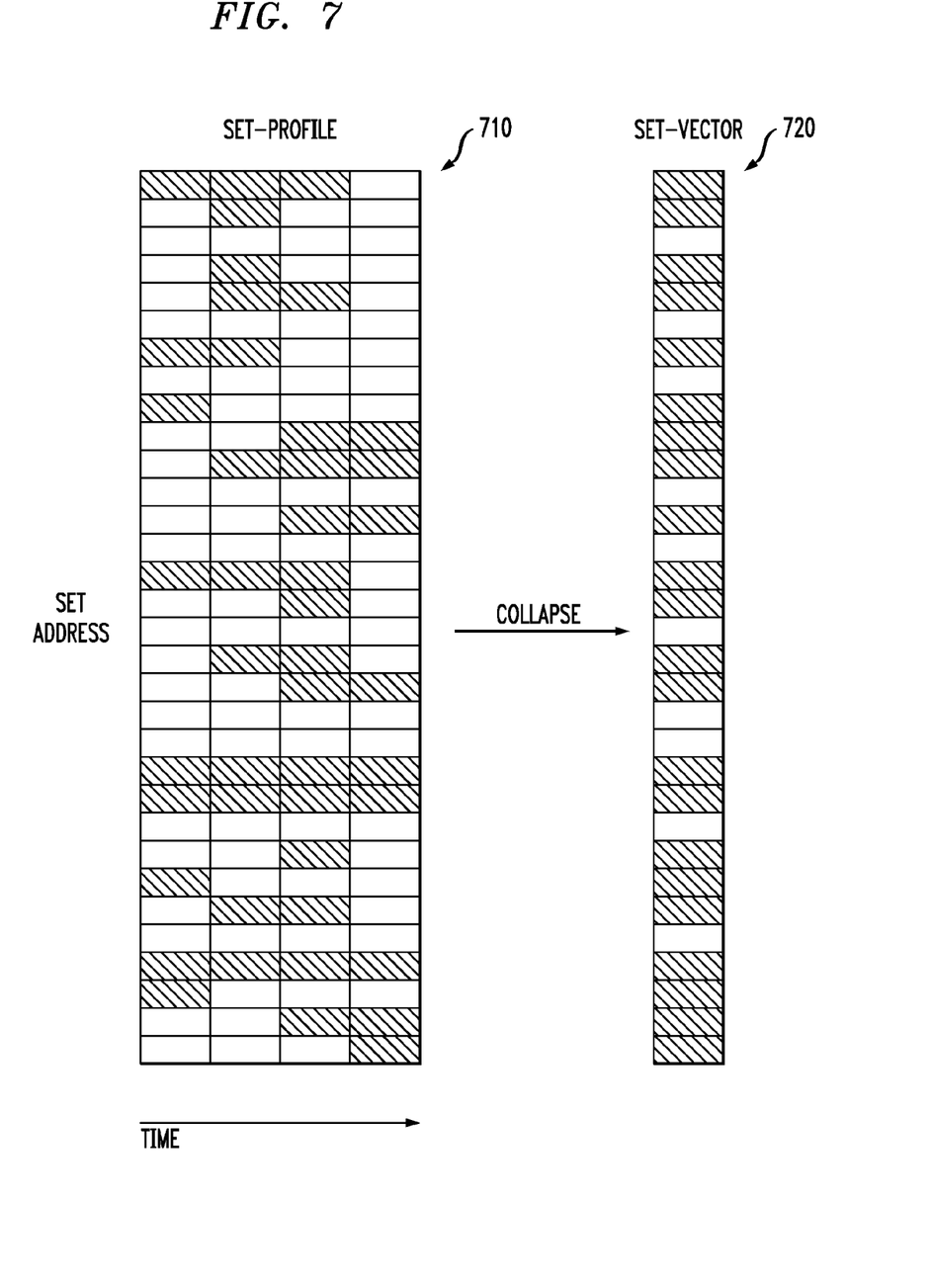
FIG. 7 illustrates a set vector that represents the sets accessed by an interrupt over its entire time.

FIG. 7 illustrates a set vector (ISV) 720 that represents the sets 710 accessed by an interrupt. In other words, the set vector (ISV) 720 indicates those sets that are live at any point in time. A set-profile 710 is formed that represents the sets accessed over time by an interrupt during its execution. The set profile 710 is a structure similar to the plot in FIG. 5B, except that its shaded entries represent sets that are accessed, and not live sets. A set-vector 720 is formed from the set-profile 710 that represents all the cache sets accessed by an interrupt, regardless of time. The entries of the set-profile 710 are associated with cache sets one-to-one. A shaded entry in the set-vector 720 represents a set that is accessed by the interrupt.

Figure 8:
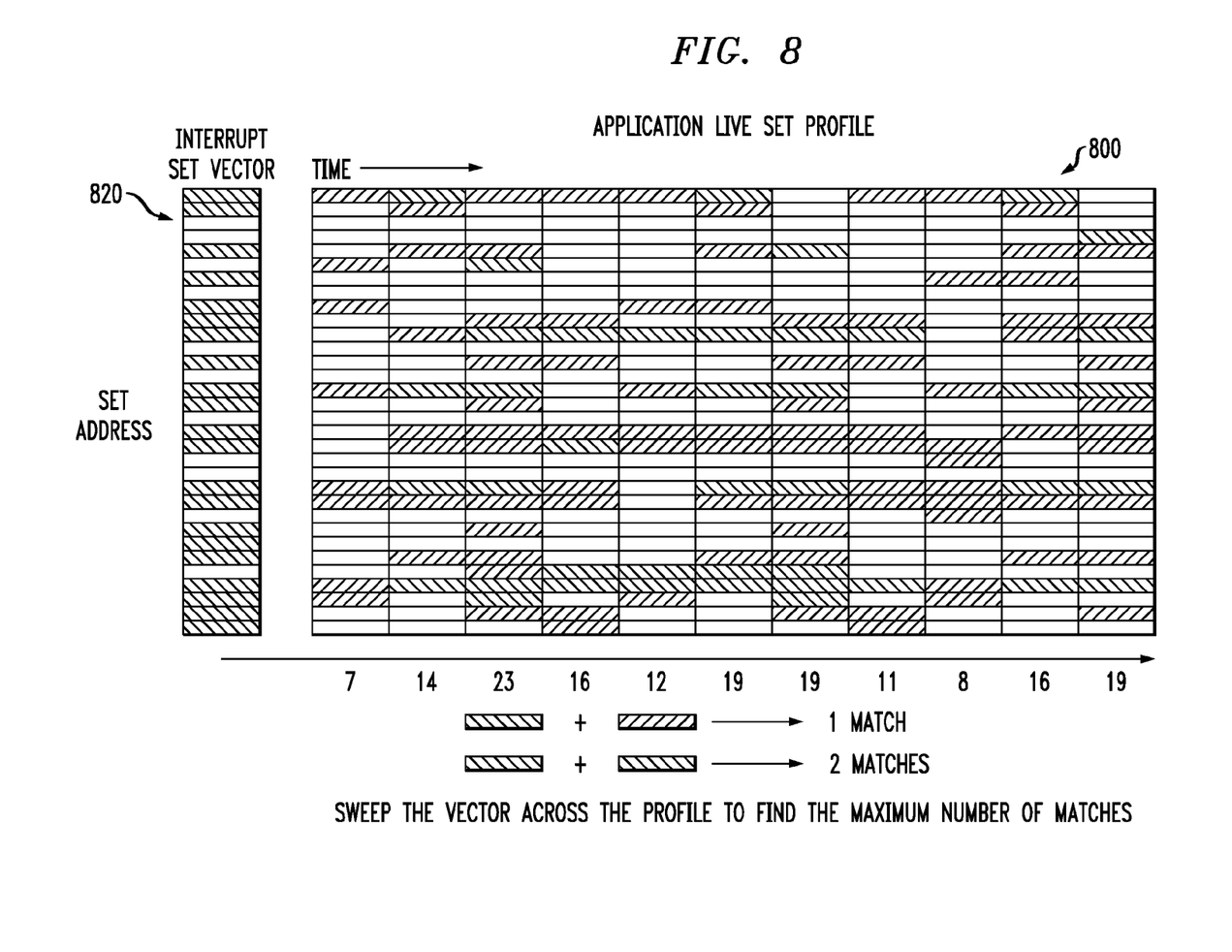
FIG. 8 illustrates a technique for determining the worst-case intersection between a set vector and a profile of an application's live set.

The "application sets" described above in the sub-section entitled "Set Model" are represented by column vectors in an "application live-set profile" matrix 800 shown in FIG. 8. The tows of the application live-set profile matrix 800 represent individual cache sets. The live-set profile 800 is the distribution of live-sets in the cache during the execution of the application. A column vector 820 represents the set vector of the interrupt. The matrix 800 is similar to FIG. 5B except that a live-set with one live frame is shaded light gray and one with two live frames is shaded dark gray.

Since the row dimensions of the interrupt set-vector (ISV) 820 and the application set profile (AP) 800 are the same (the number of cache sets), the cardinality of the intersection of the sets represented by the ISV and a column in the AP 800 is achieved by examining shaded elements of each column that are in the same row. As shown in FIG. 8, if an element in the AP 800 is light gray, at most one live frame in the corresponding set may experience an eviction, and one is added to the cardinality of the intersection. If the AP element is dark gray, at most two live frames in the corresponding set may experience evictions, and two is added to the cardinality of the intersection.

The cardinalities of the intersections of the set represented by the ISV with the sets represented by columns in the AP is found. They each represent the maximum number of live frames that may experience evictions caused by an interrupt, at the interrupt point represented by the AP column. The maximum of these cardinalities is the bound and represents the maximum effect of an interrupt occurring at the worst possible time.

These cardinalities are shown in FIG. 8 under the columns of the live-set profile 800. For example, if the interrupt occurs during the first time period (the first column), it may cause a maximum of seven additional misses. A maximum count (23)

results from an interrupt at the third time point, causing the worst-case effect on the application shown.

This approach assumes that every block inserted by an interrupt into a live-set that contains one live frame evicts the block in that frame. This is conservative if the set contains two or more frames. In that case, the interrupt may not access the live frame. While conservative, the approach achieves a tight bound. Methods producing tighter bounds must either track least recently used state over the run time of a system (an unrealistic endeavor) or set least recently used state at appropriate times.

When this approach is applied to the exemplary AMR application discussed above in conjunction with FIGS. 5A and 5B, and an illustrative interrupt which accesses 64 out of 128 cache sets (i.e., the indexes of the sets it accesses are 0x00 to 0x0F) improved results are obtained. The result is that this interrupt will cause no more than 48 misses in the AMR application regardless of when it occurs. Compare this result to that of the initial simplistic approach (256 misses) and the initial live frame analysis (162 misses). These two results are independent of the nature of the interrupt, so they may be compared with the current result.

Figure 9:
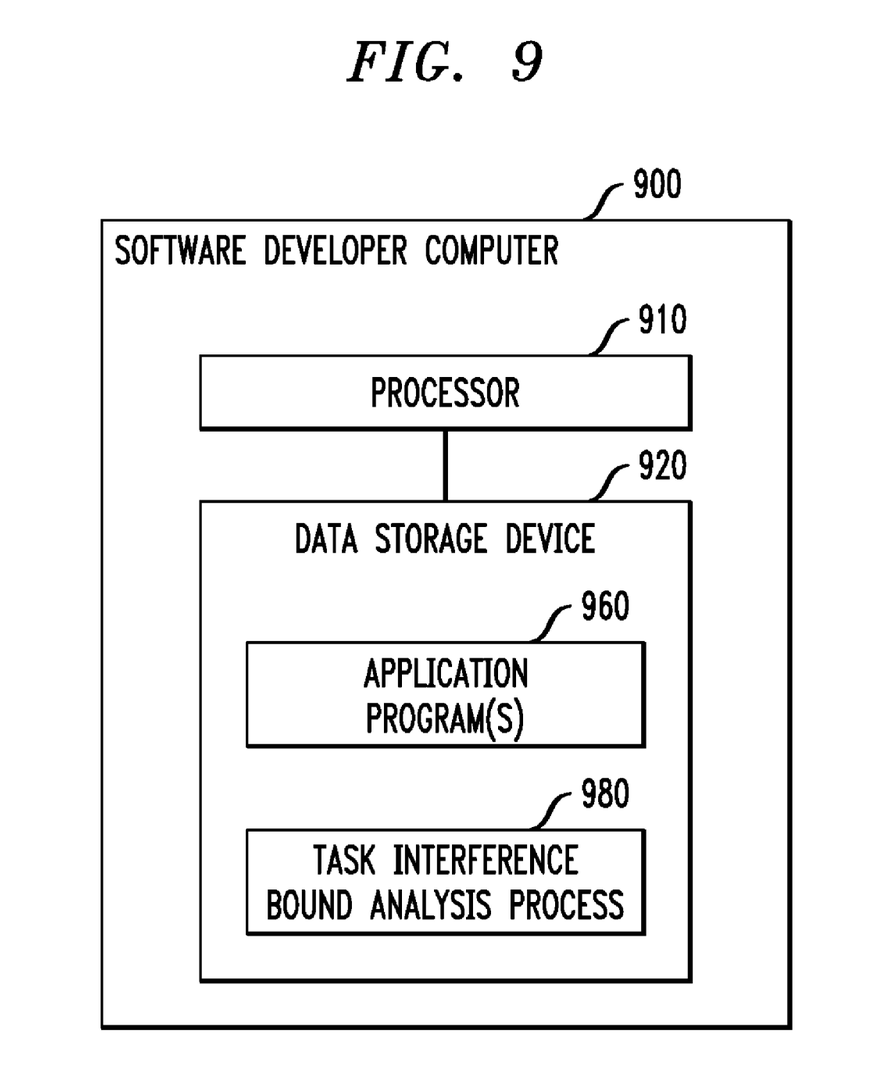
FIG. 9 is a schematic block diagram showing the architecture of an exemplary software developer's computer incorporating features of the present invention.

FIG. 9 is a schematic block diagram showing the architecture of an exemplary software developer's computer 900 incorporating features of the present invention. The software developer's computer 900 may be embodied as a general purpose computing system, such as the general purpose computing system shown in FIG. 9. The software developer's computer 900 includes a processor 910 and related memory, such as a data storage device 920, which may be distributed or local. The processor 910 may be embodied as a single processor, or a number of local or distributed processors operating in parallel. The data storage device 920 and/or a read only memory (ROM) are operable to store one or more instructions, which the processor 910 is operable to retrieve, interpret and execute.

As shown in FIG. 9, the data storage device 920 of the software developer's computer 900 optionally contains one or more application programs 960 that are being developed of that may be sharing the cache and interfere with the programs 960. It is noted that the application programs 960 being analyzed may be developed and/or executed on a remote machine and merely analyzed on the software developer's computer 900, as would be apparent to a person of ordinary skill in the art. In addition, the data storage device 920 includes a task interference bound analysis process 980 incorporating features of the present invention.

As is known in the art, the methods and apparatus discussed herein may be distributed as an article of manufacture that itself comprises a computer readable medium having computer readable code means embodied thereon. The computer readable program code means is operable, in conjunction with a computer system, to carry out all or some of the steps to perform the methods or create the apparatuses discussed herein. The computer readable medium may be a recordable medium (e.g., floppy disks, hard drives, compact disks, or memory cards) or may be a transmission medium (e.g., a network comprising fiber-optics, the world-wide web, cables, or a wireless channel using time-division multiple access, code-division multiple access, or other radio-frequency channel). Any medium known or developed that can store information suitable for use with a computer system may be used. The computer-readable code means is any mechanism for allowing a computer to read instructions and data, such as magnetic variations on a magnetic media or height variations on the surface of a compact disk.

The present invention achieves a tight worst-case execution time bound on the effect of task interference in an instruction cache. The present invention produces a bound that is time independent (i.e., it is valid regardless of when interventions occur). One embodiment achieves a bound that is independent of the cache sets accessed by intervening tasks. The bound is the maximum live frames coexistent in the analyzed task.

If the sets accessed by intervening tasks may be determined, a tighter bound is achieved by using two alternate embodiments. These alternate embodiments are suitable for embedded systems in which a limited number of tasks execute and system efficiency is extremely important, a relatively common situation.

The present invention assumes that the cache sets accessed by an analyzed task may be determined via simulation. This may not be practical in some situations, e.g., it many different set access patterns are possible, and they do not all occur during extensive simulation. However, it is sometimes sufficient or prudent to establish a "pseudo-bound," one that is rarely exceeded, instead of one that is never exceeded. It may be wasteful to design a system that accommodates infrequent situations, especially if they are responsible for a large increase in a bound. This is often true in communications systems.

It is to be understood that the embodiments and variations shown and described herein are merely illustrative of the principles of this invention and that various modifications may be implemented by those skilled in the art without departing from the scope and spirit of the invention.

We claim:

1. A method for establishing a bound on the execution time of an application due to task interference in an instruction cache shared by a plurality of tasks, said method comprising the steps of:

determining a number of live frames of said application that are coexistent during execution of said application; and establishing said bound based on said number of live frames of a set-associative cache, wherein said bound is suitable for use in allocating processing resources, wherein one or more steps of said method are performed by at least one hardware device, wherein said step of establishing said bound further comprises the steps of determining an effect of an interrupt at each possible interrupt point and establishing said bound based on a maximum of said effect of an interrupt at each possible interrupt point.

2. The method of claim 1, wherein said number of live frames is a number of cache frames that contain a block that is accessed by said application in the future without an intervening eviction.

3. The method of claim 1, wherein said number of live frames is determined by a post-execution analysis of cache access patterns of said application.

4. The method of claim 1, wherein said number of live frames is determined by a run-time analysis of cache access patterns of a simulation of said application.

5. A system for establishing a bound on the execution time of an application due to task interference in an instruction cache shared by a plurality of tasks, said system comprising:

a memory that stores computer-readable code; and a processor operatively coupled to said memory, said processor configured to implement said computer-readable code, said computer-readable code configured to:

determine a number of live frames of said application that are coexistent during, execution of said application; and establish said bound based on said number of live frames of a set-associative cache, wherein said bound is suitable for use in allocating processing resources, wherein said step of establishing said bound further comprises the steps of determining an effect of an interrupt at each possible interrupt point and establishing said bound based on a maximum of said effect of an interrupt at each possible interrupt point.

6. The system of claim 5, wherein said number of live frames is a number of cache frames that contain a block that is accessed by said application in the future without an intervening eviction.

7. The system of claim 5, wherein said number of live frames is determined by a post-execution analysis of cache access patterns of said application.

8. The system of claim 5, wherein said number of live frames is determined by a run-time analysis of cache access patterns of a simulation of said application.

9. An article of manufacture for establishing a bound on the execution time of an application due to task interference in an instruction cache shared by a plurality of tasks, comprising:
a tangible computer readable recordable storage medium having computer readable code means embodied thereon, said computer readable program code means comprising:
a step to determine a number of live frames of said application that are coexistent during execution of said application;
a step to establish said bound based on said number of live frames of a set associative cache, wherein said bound is suitable for use in allocating processing resources;
a step to determine an effect of an interrupt at each possible interrupt point and establish said hound based on a maximum of said effect of an interrupt at each possible interrupt point.

10. A system for establishing a bound on an effect of task interference on an application in an instruction cache shared by a plurality of tasks, said system comprising:
means for determining a number of live frames of said application that are coexistent during execution of said application;
means for establishing said bound based on said number of live frames of a set-associative cache, wherein said bound is suitable for use in allocating processing resources; and
means for determining an effect of an interrupt at each possible interrupt point and establish said bound based on a maximum of said effect of an interrupt at each possible interrupt point.

11. The system of claim 10, wherein said number of live frames is determined by a post-execution analysis of cache access patterns of said application.

12. The system of claim 10, wherein said number of live frames is determined by a run-time analysis of cache access patterns of a simulation of said application.

* * * * *

UNITED STATES PATENT AND TRADEMARK OFFICE
CERTIFICATE OF CORRECTION

PATENT NO. : 8,191,067 B2
APPLICATION NO. : 12/027683
DATED : May 29, 2012
INVENTOR(S) : Michael R. Betker, Harry Dwyer and John S. Fernando It is certified that error appears in the above-identified patent and that said Letters Patent is hereby corrected as shown below:

In the Claims

Column 12, claim 9, line 2, which reads: "of a set associative cache" should read --of a set-associative cache--; column 12, claim 9, line 3, which reads: "processing resources;" should read --processing resources; and--; and column 12, claim 9, line 5, which reads: "said hound based" should read --said bound based--.

Signed and Sealed this
Twenty-second Day of October, 2013

Teresa Stanek Rea
*Deputy Director of the United States Patent and Trademark Office*